3,052,548
METHOD OF STABILIZING FOAM ON MALT BEVERAGES
Anthony L. Nugey, 1271 Pierpont St., Rahway, N.J.
No Drawing. Filed Feb. 9, 1959, Ser. No. 792,196
10 Claims. (Cl. 99—48)

This invention relates to fermented malt beverages capable, when poured into glasses, of producing foam that is uniform in quality and stability, and of relatively long duration. Fermented malt beverages include beer, ale, porter stout and the like. This invention is similar to that disclosed in a copending application, my Serial No. 781,940 filed December 22, 1948, and now abandoned dealing with synthetic polysaccharide and other substances in a preparation to be used for the same purpose.

The important characteristics sought by the consuming public in such beverages are brilliancy, taste, flavor, palatability and long lasting foam in large volume when the beverage is poured into glasses for drinking.

Beer foam is due to ingredients in beer, for example, such as peptones and other protein derivatives, malt gums, hop resins, organic acids, dextrins and carbon dioxide. With these substances present in beers regardless of quantity, it is still difficult to produce natural long lasting foam which will remain creamy and voluminous until the beer has been consumed. To obtain this result is considered highly desirable in the science of brewing.

Many factors are responsible for natural foam deficiency. A few of these are mentioned here—uncontrolled degradation of natural peptones and other protein derivatives caused by chill-proofing mediums; excessively shap filtration; high ratio of adjuncts to malt used in brews; improper peptonization of malt within the main malt mash; insufficient carbonation; and excessive amounts of air, sulfur dioxide and metals in the beer.

Foam on beer is an emulsion of small gaseous bubbles suspended in the liquid created by true colloidal substances which are in perfect dispersion. These small gaseous bubbles produce foams which are more creamy in texture and are extremely stable as compared to artificial bubbles represented by their coarseness.

When beer is poured or drawn, the bubbles are enclosed within a thin and strong elastic film. The surface tension within the films is greater than that in the beer itself, and holds the mols of liquid together.

The surface tension which acts on the surface of liquids makes them behave like an elastic fabric. When gaseous bubbles rise, or surface from a liquid, a liquid dome is raised above the bubbles. A liquid incapable of foaming will lack the elasticity and consequently the dome of the bubble will burst instantly. When bubbles are small they are practically spherical and completely submerged. The base of the bubbles is nearly a flat plane and the surface tension of this flat liquid plane outside of the bubbles is equilibrated by a tension stress.

The surface tension can be increased or decreased by various colloids. Gums increase surface tension; certain glucosides reduce it; malt fat and oils, present in malt, increase the surface tension in beer.

To improve beer foam, proper colloidal additives must be used. Such additives must lower the surface tension, have slight effect on the normal viscosity of beer, and must not impair brilliancy, flavor, taste, or lower the palatability of the finished fermented malt beverage.

Many laboratory tests have been developed to measure foam quantity and stability. Those in common use are: shaking; pouring; gas bubbling; dropping; weighing collapsed foam; and measuring foam volumes. Unquestionably, a simpler and more positive test must exit, to permit quantative measurement of foam-production and foam-keeping qualities. Foam-keeping capacity is definitely of greater importance than foam-production, because it must resist rapid collapse of the foam after beer is poured or drawn.

Aside from the differences of procedure in making the aforementioned foam tests, the brewing industry must be governed by the consumers' method of foam evaluation, that is, after beer is poured or drawn into a glass, the consumer always observes whether or not the foam is creamy and of good quality and if the foam is enduring. Therefore, direct visual or physical observations of foam-production and foam-keeping capacities give more reliable results than most of the so-called laboratory tests.

Colloidal additives, such as peptones, proteins, natural gums (karaya, tragacanth and arabic) and ethyl and methyl cellulose, and sodium carboxymethyl cellulose tend to increase foam stabilization to a minor degree, but present numerous disadvantages.

Proteins and peptones are objectionable because their prices are too high, ranging from $1.00 to over $1.50 per pound; also they contain saphrophytic bacteria which produces disagreeable odors, and finally they eventually, within a few days cause cloudiness and loss of brilliancy in beers.

Natural gums, such as karaya, tragacanth and arabic do not make foam regardless of concentrations used. They are contaminated with bacterial and/or fungoidal organisms. If too high concentrations are used, filtration difficulties are introduced and the natural beery taste of malt beverages is affected. There are 4 grades of natural gums commercially available, namely—standard, select, initial and special process. The special process gums are white, the other three grades contain amber particles and bark ground in with the gums, making the gums off-white in color not suitable for brewing purposes. The prices of natural gums range from 29¢ per lb. for the standard grade up to 45¢ per lb. for the special process grades.

Ethyl and methyl cellulose, while they are free from bacterial contamination, they do not produce foam of themselves; and their costs are excessive, ranging from 80 cents to $1.00 per lb.

Sodium carboxymethyl cellulose contains traces of metallic impurities, and its cost ranges from 75 cents to $1.00 per lb. I have discovered that using ethyl cellulose, methyl cellulose, or sodium carboxymethyl alone or in combination with each other produces a haze when they are dissolved in distilled water. This effect is not desired when brilliant beers are to be made.

One of the objects of the present invention is to provide an improved method for the production of stable foams on fermented malt beverages.

Another object is to produce much more foam in fermented malt beverages.

Still another object is to provide an improved method of stabilizing foams in kraeusened fermented malt beverages.

Yet another object is to provide an additive which produces and stabilizes beer foam economically.

An additional object is to provide an additive which not only extends the foamlife in fermented malt beverages regardless of pH values, but will yield foam in very minute bubbles, possesses exceptional adhesive properties, and is free of bacterial and fungoidal organisms.

All of these related objects are attained by incorporating into fermented malt beverages at any stage after fermentations have been completed and prior to packaging said fermented malt beverages, small quantities of synthetic polysaccharide preferably by itself, or in combination with a synthetic gum (ethylcellulose) containing 6 carbon atoms, and corn sugar having a dextrose equivalent of approximately 42%.

The particular synthetic polysaccharide substance most suitable for my invention will yield reducing sugars, galactose and a third minor unknown sugar constituent when hydrolyzed with acids or enzymes, and having this formula $(C_6H_{10}O_5)$. This synthetic polysaccharide substance is produced from starch conversion sirups and other conversion sirups by means of polymerization reactions conducted at temperatures between 100 and 200 degrees C., in the presence of volatile and non-volatile acid catalysts as described in U.S. Patent No. 2,563,014, issued to Harry W. Durand. A suitable polysaccharide for this invention is that sold as "Polyose" by the Corn Products Sales Company having these properties:

| | |
|---|---|
| Moisture content | 2.0%. |
| Density, lbs./cu. ft. | 23 approximate. |
| Color, 60% soln., Hellige | 10 maximum. |
| pH, 10% soln. | 3.5 minimum. |
| Ash, dry basis | 0.50% maximum. |
| Solubility in water | Easily. |
| Aqueous concentrations | 67% solids. |
| Viscosity (Brookfield) at 70° F. | 20 to 100 poises. |
| Appearance | White to light tan powder. |

When the Polyose is taken alone, the quantity used is ¼ to 5 ounces thereof for every barrel of beer or ale, added at any stage after fermentation of the beverage.

I have discovered that the examples illustrated below illustrate my invention and it shall be understood that the specific examples set forth below do not limit the scope of this invention since numerous changes and modifications contemplated fall within the scope of the appended claims.

Example I:
 5 lbs. synthetic polysaccharide ("Polyose-A")
 ½ lb. synthetic gum ("Methocel")
 ¼ lb. to 1 lb. sodium bicarbonate Example II:
 5 lbs. synthetic polysaccharide ("Polyose-A")
 2½ to 4 lbs. corn sugar ("Frodex" or "OK DriSweet")
 6 to 16 ounces synthetic gum ("Methocel")
 4 to 16 ounces sodium bicarbonate
 5 to 16 grams sodium bisulphite Example III:
 5 lbs. synthetic polysaccharide ("Polyose-A")
 4 to 16 ounces sodium bicarbonate Example IV:
 5 lbs. synthetic polysaccharide ("Polyose-A")
 3 to 4 lbs. corn sugar ("Frodex" or "OK DriSweet")
 6 to 10 ounces synthetic gum ("Methocel")
 4 to 16 ounces sodium bicarbonate
 2 to 10 grams sodium bisulphite
 1 to 4 grams sodium benzoate Example V:
 5 lbs. synthetic polysaccharide ("Polyose-A")
 2½ to 4 lbs. corn sugar ("Frodex" or "OK DriSweet")
 6 to 10 ounces synthetic gum ("Methocel")
 3 to 6 ounces sodium bisulphite
 1 to 3 grams sodium benzoate Example VI:
 4 lbs. synthetic polysaccharide ("Polyose-A")
 3 lbs. corn sugar ("Frodex" or "OK DriSweet")
 ½ lb. synthetic gum ("Methocel")
 ½ lb. sodium bisulphite
 100 to 200 mgs. sodium benzoate Example VII:
 4 lbs. synthetic polysaccharide ("Polyose-A")
 3 lbs. corn sugar ("Frodex" or "OK DriSweet")
 ½ lb. synthetic gum ("Methocel")
 ½ lb. sodium bisulphite
 100 to 200 mgs. sorbic acid Example VIII:
 5 lbs. synthetic polysaccharide ("Polyose-A")
 3 lbs. corn sugar ("Frodex" or "OK DriSweet")
 8 to 16 ounces synthetic gum ("Methocel")
 2 to 4 ounces sodium bisulphite
 1½ to 4 grams sodium benzoate The purpose of the sodium bicarbonate is to raise the rather acidic pH of "Polyose-A" to that compatible of beer. In this respect I may use as substitutes other alkali such as sodium hydroxide in smaller quantities and/or tri sodium phosphate, or sodium phosphate dibasic. Sodium citrate with an alkaline pH may also be used.

The specific examples illustrated as I to VIII inclusive are compatible with beer ingredients and produce copious foam volumes with long foam life. The formulating cost is considerably below the price range of natural gums, and we have found that 4 to 5 lbs. per 100 barrels of beer (3100 U.S. gals.) is adequate. Of course, a higher concentration may be used if additional foam volume is desired.

Having described my invention, what I believe to be new is:

1. A substance for improving the foam on a malt beverage when poured for drinking, containing ¼ to 5 ounces of synthetic polyaccharide, ethyl cellulose, and corn sugar having a dextrose equivalent of about 42%, the polysaccharide having the following characteristics:

| | |
|---|---|
| Moisture content | 2.0% maximum. |
| Density, lbs./cu. ft | 23 approximate. |
| Color, 60% soln., Hellige | 10 maximum. |
| pH, 10% soln | 3.5 minimum. |
| Ash, dry basis | 0.50% maximum. |
| Solubility in water | Easily. |
| Aqueous concentrations | 67% solids. |
| Viscosity (Brookfield) at 70° F | 20 to 100 poises. |
| Appearance | White to light tan powder. |

2. The method of improving the foam on a malt beverage when poured for drinking, which consists in adding to the beverage at any stage after fermentation ethylcellulose, corn sugar having a dextrose equivalent of about 42%, and ¼ to 5 ounces of synthetic polysaccharide having the characteristics stated in claim 1 for each barrel of 31 U.S. gallons of said beverage.

3. A substance for adding to a malt beverage after fermentation consisting of the following ingredients.

5 lbs. synthetic polysaccharide
 ½ lb. synthetic gum
 ¼ lb. to 1 lb. sodium bicarbonate In the proportion of four to five pounds of said ingredients, per 100 bbls. of beer containing 3100 U.S. gallons, the synthetic polysaccharide having the characteristics stated in claim 1.

4. A substance for adding to a malt beverage after fermentation consisting of the following ingredients.

5 lbs. synthetic polysaccharide
 2½ to 4 lbs. corn sugar
 6 to 16 ounces synthetic gum
 4 to 16 ounces sodium bicarbonate
 5 to 16 grams sodium bisulphite In the proportion of four to five pounds of said ingredients, per 100 bbls. of beer containing 3100 U.S. gallons, the synthetic polysaccharide having the characteristics stated in claim 1.

5. A substance for adding to a malt beverage after fermentation consisting of the following ingredients.

5 lbs. synthetic polysaccharide
 4 to 16 ounces sodium bicarbonate

In the proportion of four to five pounds of said ingredients, per 100 bbls. of beer containing 3100 U.S. gallons, the synthetic polysaccharide having the characteristics stated in claim 1.

6. A substance for adding to a malt beverage after fermentation consisting of the following ingredients.

5 lbs. synthetic polysaccharide
3 to 4 lbs. corn sugar
6 to 10 ounces synthetic gum
4 to 16 ounces sodium bicarbonate
2 to 10 grams sodium bisulphite
1 to 4 grams sodium benzoate In the proportion of four to five pounds of said ingredients, per 100 bbls. of beer containing 3100 U.S. gallons, the synthetic polysaccharide having the characteristics stated in claim 1.

7. A substance for adding to a malt beverage after fermentation consisting of the following ingredients.

5 lbs. synthetic polysaccharide
2½ to 4 lbs. corn sugar
6 to 10 ounces synthetic gum
3 to 6 ounces sodium bisulphite
1 to 3 grams sodium benzoate In the proportion of four to five pounds of said ingredients, per 100 bbls. of beer containing 3100 U.S. gallons, the synthetic polysaccharide having the characteristics stated in claim 1.

8. A substance for adding to a malt beverage after fermentation consisting of the following ingredients.

4 lbs. synthetic polysaccharide
3 lbs. corn sugar
½ lb. synthetic gum
½ lb. sodium bisulphite
100 to 200 mgs. sodium benzoate In the proportion of four to five pounds of said ingredients, per 100 bbls. of beer containing 3100 U.S. gallons, the synthetic polysaccharide having the characteristics stated in claim 1.

9. A substance for adding to a malt beverage after fermentation consisting of the following ingredients.

4 lbs. synthetic polysaccharide
3 lbs. corn sugar
½ lb. synthetic gum
½ lb. sodium bisulphite
100 to 200 mgs. sorbic acid In the proportion of four to five pounds of said ingredients, per 100 bbls. of beer containing 3100 U.S. gallons, the synthetic polysaccharide having the characteristics stated in claim 1.

10. A substance for adding to a malt beverage after fermentation consisting of the following ingredients.

5 lbs. synthetic polysaccharide
3 lbs. corn sugar
8 to 16 ounces synthetic gum
2 to 4 ounces sodium bisulphite
1½ to 4 grams sodium benzoate In the proportion of four to five pounds of said ingredients, per 100 bbls. of beer containing 3100 U.S. gallons, the synthetic polysaccharide having the characteristics stated in claim 1.

References Cited in the file of this patent

UNITED STATES PATENTS

| | | |
|---|---|---|
| 1,235,882 | Defren | Aug. 7, 1917 |
| 1,250,095 | Cozzolino | Dec. 11, 1917 |
| 2,027,904 | Farber | Jan. 14, 1936 |
| 2,223,444 | Distler | Dec. 3, 1940 |
| 2,563,014 | Durand | Aug. 7, 1951 |
| 2,876,104 | Bliudzius et al. | Mar. 3, 1959 |